Sept. 30, 1952  J. P. LAIRD  2,611,898
BRASSIERE
Filed Nov. 22, 1950  2 SHEETS—SHEET 1
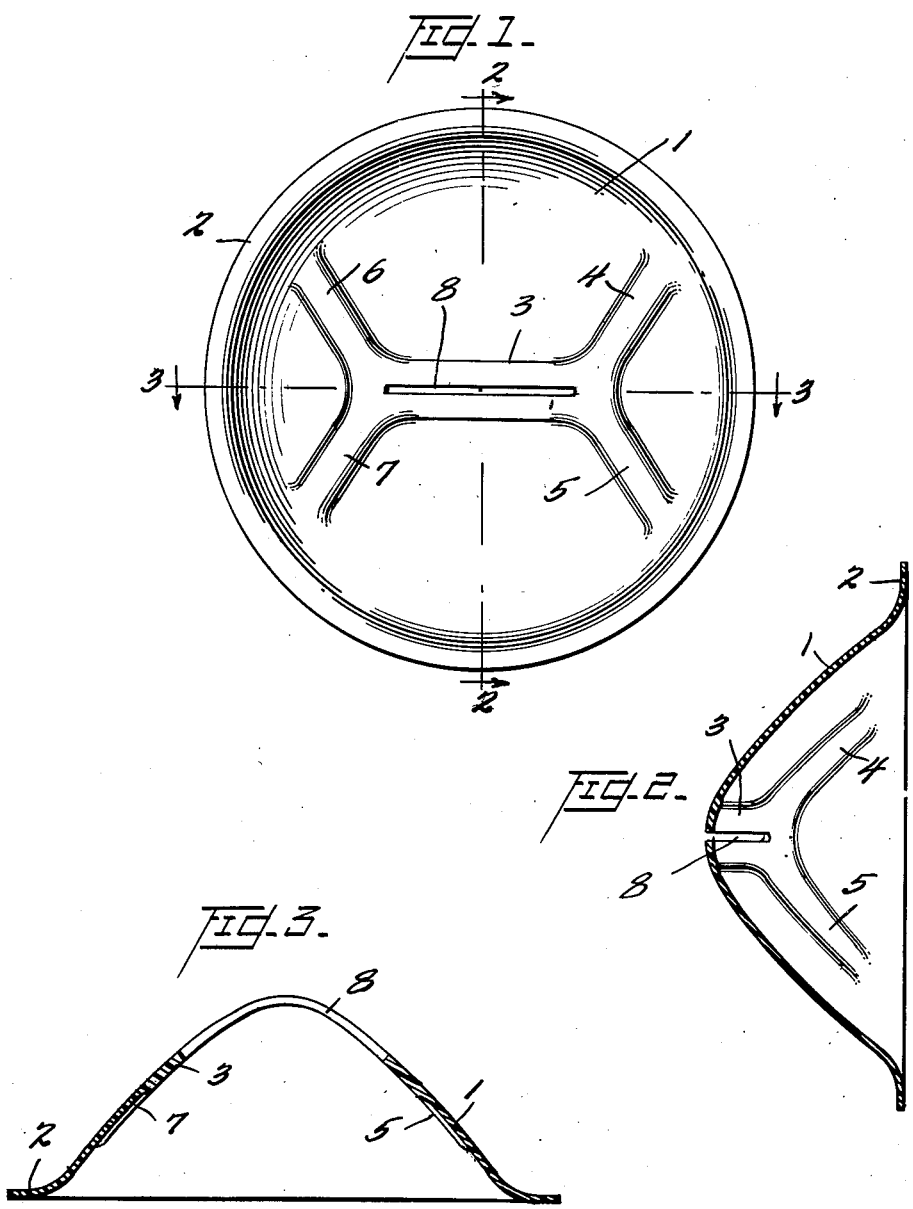
INVENTOR
Joseph P. Laird,
BY Parker Cook
ATTORNEY Sept. 30, 1952 J. P. LAIRD 2,611,898
BRASSIERE
Filed Nov. 22, 1950 2 SHEETS—SHEET 2
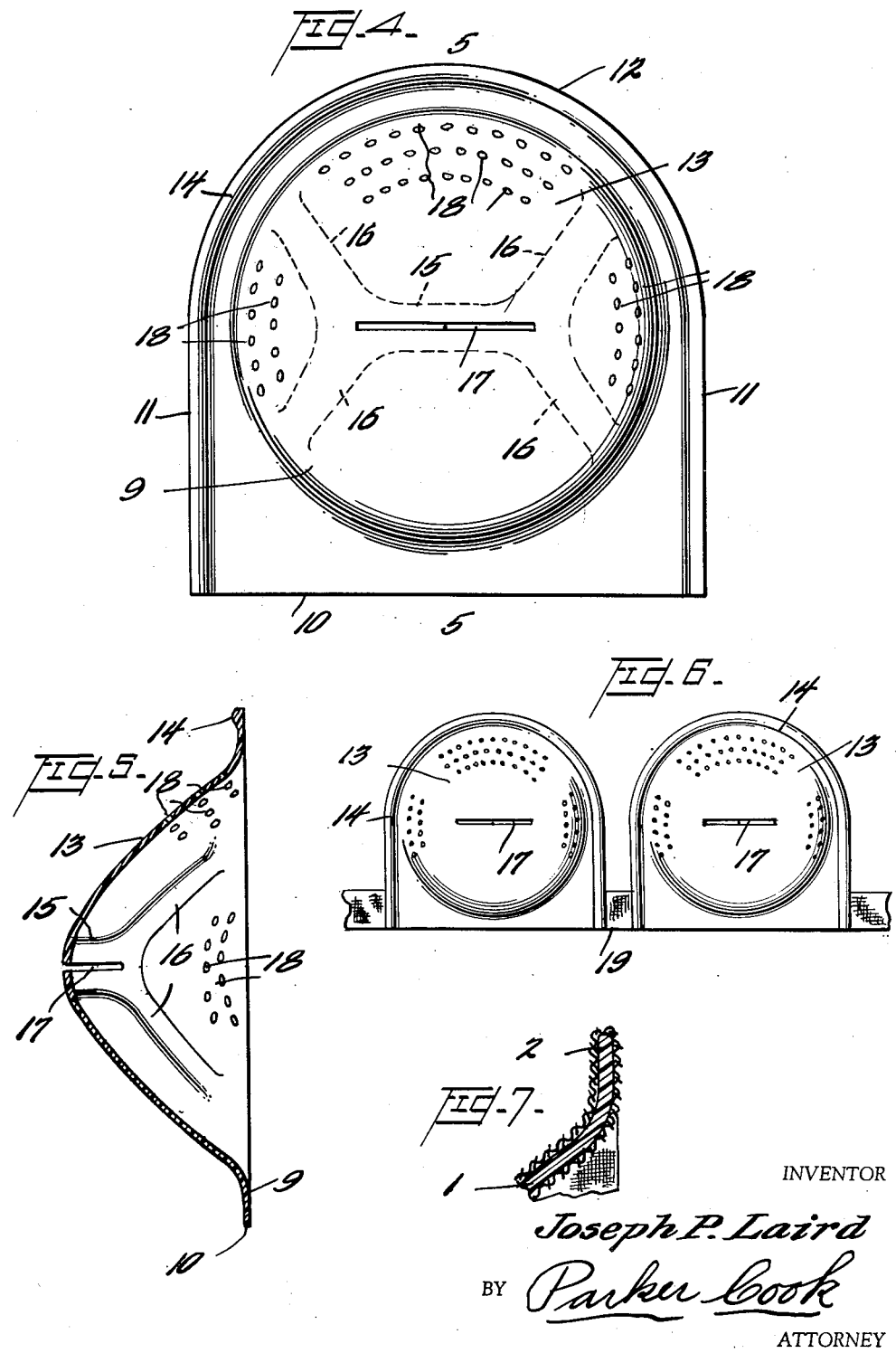
INVENTOR
Joseph P. Laird
BY Parker Cook
ATTORNEY Patented Sept. 30, 1952

2,611,898

UNITED STATES PATENT OFFICE 2,611,898

BRASSIÈRE

Joseph Paul Laird, Philadelphia, Pa.

Application November 22, 1950, Serial No. 197,072

3 Claims. (Cl. 2—42)

My invention relates to new and useful improvements in brassières, and, more particularly, to a plastic insert that is to be sewed into a textile brassière or a bathing suit.

One of the objects of the invention is to provide preferably a molded plastic cup that will have the desired resiliency in that it may easily be compressed, so that if worn by a woman while dancing, for instance, any pressure on the breast or brassière will cause the brassière to flex or compress so that the flexibility would appear natural rather than artificial.

Still another object of the invention is to provide a molded plastic cup that will normally keep its molded shape but may easily be compressed when worn or washed and will then return to its original form.

As is well known, a plastic sheet when pressed into spherical or conical form becomes more rigid than in sheet form and may offer too much resistance to a normal impact; while if a too-thin sheet of plastic is used that will not offer too great a resistance to impact, it would not have sufficient resiliency to return to its original shape after being compressed.

Therefore, another object of the invention is to provide a molded plastic insert of cup-shaped form that is relatively thin and, as it is made of what might be known as a "semi-rigid" plastic, with certain reinforcing ribs to be hereinafter mentioned, it will be easily compressible but will return to its original molded cup-shaped form.

Still another object of the invention is to provide a molded plastic cup that may be washed in lukewarm soapy water without damage, as the plastic will easily stand heat up to 122° Fahrenheit before any transition becomes noticeable and will return to form, up to a temperature of about 219°.

Thus, the brassière may be washed in lukewarm water, or even what might be termed hot water, without any damage to the same.

Still another object of the invention is to provide a plastic cup for brassières, which plastic will be tear-resistant, so that it may easily be sewed within the textile or cloth brassière; and may also be sewed in a bathing suit, since it is chemical-resistant and will not be harmed by salt water or soaps.

Still another object of the invention is to provide a plastic cup which will be semi-rigid and still made very thin, and have certain inner reinforcing ribs that are molded within the cup so that it (the cup) will return to its shape, even after being compressed.

Still another object of the invention is to provide a reinforced, molded, plastic cup having certain reinforced sections or ribs, while in a rib across the top of the cup is a slit so that the cup will be more compressible than otherwise would be the case, and still the body of the cup will be strong enough to retain its natural shape as formed in the mold.

Still another object of the invention is to form a plastic cup that is made from a relatively new plastic known as "Polythene," which is a generic term for those polymers of ethylene, which may be produced in sheets and also especially in powdered form, so that by molding the sheet the reinforcing ribs may be molded into the cup. Also, the slit across the crown of the cup may be molded at the same time.

Still another object of the invention is to produce a reinforcing molded "Polythene" cup wherein certain edges may be rounded or radiused to add further strength, so that the cups may be used in what is known as the "strapless" brassière.

With these and other objects in view, the invention consists in certain new and novel arrangements and combination of parts, as will be hereinafter more fully explained and pointed out in the claims.

Referring now to the drawings, showing a preferred form and one modification,

Fig. 1 is a front elevation of a plastic insert for a brassière,

Fig. 2 is a sectional view taken on line 2—2 of Fig. 1, looking in the direction of the arrows, Fig. 3 is a sectional view taken on line 3—3 of Fig. 1, looking in the direction of the arrows, Fig. 4 is a front elevation of a slightly modified form of insert, Fig. 5 is a sectional view taken on line 5—5 of Fig. 4, Fig. 6 is a fragmentary view on a reduced scale, showing two of the inserts in a strapless brassière, and Fig. 7 is a detailed section, showing how the insert may be sewed within the brassière.

At the outset, it will be understood that the present invention contemplates a plastic insert substantially cup-shape and preferably made from "Polythene," the generic name for those polymers of ethylene which are suitable for application as plastics.

In the present embodiment, it might be noted that these plastic cups can be cold drawn in a mold when subjected to 1200 or 1400 pounds pressure per square inch. These inserts are preferably molded from the plastic in powder form, although it is possible to make up these cups of flat sheets, but this is not as satisfactory as molding the "Polythene" cup from the powder form.

It also might be mentioned at the outset that a cup made from this "Polythene" will stand heats up to 122° Fahrenheit before any transition becomes noticeable, so that a brassière with these inserts could be washed with lukewarm water without any damage. Also, this "Polythene" is tear-resistant and will maintain its form up to a temperature of approximately 219° Fahrenheit; and, inasmuch as it is not water absorbent, it may be used in a bathing suit brassière; and, since it is chemical resistant, it will not be harmed by salt water or soaps.

Referring now to the several views and for the moment to Fig. 1, there is shown by novel insert for brassières, which consists of a disc 1 (in plan view) of a sheet of plastic of substantially (.015") fifteen thousandths of an inch in thickness; preferably one of the "Polythene" plastics, as these plastics have certain characteristics desirable for a brassière insert. The plastic when molded is not limp like a rubber plastic, nor on the other hand is it too rigid, but might be termed "semi-rigid." About the circumference of the disc 1 is a rim or flange 2, so that when sewed into the brassière, the threads may be passed through this rim 2.

As may also be seen in Fig. 1, there is a reinforcing rib 3 that extends partly across the insert 1; and then the rib 3 is bifurcated to form the additional ribs 4 and 5 at the one side, and the ribs 6 and 7 at the other side. These ribs 3, 4, 5, 6 and 7 are preferably substantially (.025) twenty-five thousandths of an inch in thickness; and the ribs 4, 5, 6 and 7 are substantially one-quarter of an inch in width, while the main portion of the rib 3 is slightly wider.

As may be seen in Figs. 2 and 3, this sheet or insert 1 is molded to a cup-shape form (in side elevation), so as to follow the contours of the human breast; and, of course, these inserts will be of different sizes, to be inserted likewise in brassières of different sizes.

I have found that if I mold the plastic sheet without the ribs, the insert will not be self-sustaining; and if the main rib is not provided with an additional slot, as about to be mentioned, when the insert is molded it is likely to be too rigid, so that if pressed it would offer unwanted resistance. However, I have found that by providing the ribs as outlined and making the insert cup-shaped, and then providing a slot 8 substantially co-extensive in length with the rib 3, the disc 1 may be compressed even by a slight touch and then will quickly thereafter return to its molded form.

Therefore, by using a semi-rigid plastic and reinforcing the body and putting a slot in the main rib, the insert will be form-sustaining; and even if depressed slightly, for instance, by a partner when dancing, any slight rigidity in the disc or insert would not be noticeable.

Referring now to the modified form as shown in Figs. 4 to 6 inclusive, it will be noticed that in this instance I make the sheet of plastic 9 straight on the bottom as at 10 with parallel side walls 11, and semi-circular around the upper portion as at 12. In this sheet 9 there is the cup-shaped portion or pocket 13 formed, as may be seen in Fig. 5, so that as far as has been mentioned, the only difference is that there is more plastic in the sheet, and the bottom is flat rather than circular.

Furthermore, to make the insert or plastic sheet 9 self-supporting, I provide an additional rib 14 that extends around the two sides 11, and also across the upper portion 12; and this rib 14 will tend to hold the insert 9 in its upright position when used with a strapless brassière, or used in the upper portion of a bathing suit.

Heretofore, different devices have been used, such as wire inserts, but these offer certain objections, such as pressure on the breast, etc. that is not to be desired. I have found that by using a reinforcing rib of the molded plastic, I can dispense with any auxiliary metal reinforcement.

It will be noticed that this form of insert 9 has the center rib 15, the bifurcated ribs 16 to the opposite sides; and there is the central slot 17 that is exactly like that used in the preferred form.

Also, in this instance, besides the additional rib 14, I make the upper portion of the insert 9 perforate, there being a plurality of openings 18 formed, as may be seen in the several figures.

In Fig. 6 I have shown these two inserts as secured in a textile brassière 19; and it will be understood that this is illustrative only as these inserts may be used in any desired form of brassière.

In Fig. 7 I have just shown a fragmentary portion of the insert, as shown in the preferred form, as being sewed within a brassière; and it will be understood that both in the preferred and modified forms, the insert is to be used within a brassière formed of textile material.

From the foregoing, it will be seen that I have provided a plastic insert molded in sheet form that has a certain amount of desired rigidity and still, if slightly compressed, will offer no serious resistance and will immediately return to its molded form.

Furthermore, it will be seen that these inserts will always keep the pockets of a textile brassière in its cup-shaped form, even if the breasts of the person who wears them are not large enough to fill the pockets of the brassière.

As mentioned in the earlier part of the specification, I have found this "Polythene" the most desirable plastic, as it may be cheaply molded; will retain its shape; may easily be washed; and will not be affected by chemicals, salt water, etc.

It will also be appreciated that by molding these inserts into sheets, there are no rough edges that call for special binding in the brassière; and inasmuch as the material is so light in weight, it does not in any way encumber the brassière.

Many slight changes might be made without departing from the spirit and scope of the invention.

Having thus described my invention, what I claim as new and desire to secure by Letters Patent is:

1. An insert for a brassière and the like, substantially cup-shaped in form, formed from a sheet of molded plastic of approximately fifteen thousandths of an inch (.015") in thickness and provided with molded ribs, one of which extends horizontally across the center of the cup-shaped form, the others of which extend from near the outer periphery towards the center, the thickness of the molded ribs being substantially twenty-five to thirty thousandths of an inch (.025" to .030"), and the said center rib being provided with a slot extending substantially throughout the length of the rib for lessening the rigidity of the rib but the ribs still being of sufficient rigidity to cause the insert to return to its molded shape if depressed.

2. An insert to be sewed in the pockets of a textile brassière, consisting of a relatively thin semi-rigid molded plastic sheet, a cup-like pocket formed in the sheet, the marginal edges about the outer walls of the pocket adapted to receive the threads when the insert is sewed into the pockets of the brassière, reinforcing ribs in the insert, one extending horizontally across the pocket, said latter rib being slotted and the other of said ribs being non-radial, and the slotted rib having the slot extending substantially throughout its length and the thickness of the ribs being such as to cause the insert to return to its original form if depressed.

3. An insert for a brassière and the like, formed from a thin sheet of molded plastic, said insert substantially cup-shaped in form, and provided with integral, non-radial, molded ribs extending from near the outer periphery towards the center, their inner ends terminating short of the center; an additional rib extending completely across the center and connected to the inner end of said aforementioned ribs; said additional rib provided with a slot therein, the slot in said rib extending throughout the length thereof, and the slot decreasing the rigidity of the insert but the ribs still being of sufficient rigidity to cause the insert to return to its molded shape if depressed.

JOSEPH PAUL LAIRD.

REFERENCES CITED

The following references are of record in the file of this patent:

UNITED STATES PATENTS

| Number | Name | Date |
|---|---|---|
| 1,231,530 | Roberts | June 26, 1917 |
| 1,239,520 | Reeves | Sept. 11, 1917 |
| 2,191,545 | Schneider | Feb. 27, 1940 |
| 2,391,417 | Hill | Dec. 25, 1945 |
| 2,445,767 | Dickerson | July 27, 1948 |
| 2,489,591 | Saffady | Nov. 29, 1949 |